US010593500B2

(12) United States Patent
Zheng et al.

(10) Patent No.: US 10,593,500 B2
(45) Date of Patent: Mar. 17, 2020

(54) LINKAGE GEAR MECHANISM FOR AUTOMATIC OPENING/CLOSING DRIVING MECHANISM

(71) Applicant: HONGXIU ELECTRICAL CO., LTD., Wenzhou, Zhejiang (CN)

(72) Inventors: Wenxiu Zheng, Zhejiang (CN); Yiyang Zheng, Zhejiang (CN); Jiangbo Qian, Zhejiang (CN)

(73) Assignee: HONGXIU ELECTRICAL CO., LTD., Wenzhou, Zhejiang (CN)

( * ) Notice: Subject to any disclaimer, the term of this patent is extended or adjusted under 35 U.S.C. 154(b) by 0 days.

(21) Appl. No.: 15/759,186

(22) PCT Filed: Aug. 11, 2016

(86) PCT No.: PCT/CN2016/094613

§ 371 (c)(1),
(2) Date: Mar. 9, 2018

(87) PCT Pub. No.: WO2017/025049

PCT Pub. Date: Feb. 16, 2017

(65) Prior Publication Data

US 2018/0254161 A1 Sep. 6, 2018

(30) Foreign Application Priority Data

Aug. 12, 2015 (CN) .......................... 2015 1 0490083
Aug. 12, 2015 (CN) ..................... 2015 2 0601886 U

(51) Int. Cl.
*H01H 75/00* (2006.01)
*H01H 71/10* (2006.01)
(Continued)

(52) U.S. Cl.
CPC .......... *H01H 71/1009* (2013.01); *H01H 3/40* (2013.01); *H01H 3/42* (2013.01);
(Continued)

(58) Field of Classification Search
CPC .......... H01H 50/06; H01H 50/18; A61N 5/06; A61N 1/20
(Continued)

(56) References Cited

U.S. PATENT DOCUMENTS 3,938,306 A * 2/1976 Bous ........................ D01H 4/48 57/263
5,125,120 A * 6/1992 Baron ....................... E03D 1/32 137/624.12
(Continued)

FOREIGN PATENT DOCUMENTS

CN 102696209 A 3/2013
CN 103367060 A 10/2013
(Continued)

*Primary Examiner* — Shawki S Ismail
*Assistant Examiner* — Lisa N Homza
(74) *Attorney, Agent, or Firm* — Christensen, Fonder, Dardi & Herbert PLLC

(57) ABSTRACT

A linkage worm gear for an automatic opening/closing driving mechanism, wherein the linkage worm gear is integrally and concentrically provided with a worm gear driven portion, a gear driving portion and a cam linkage portion successively in the direction of the rotation central axis thereof; worm gear teeth fitted with a driving worm gear are provided on the whole peripheral wall of the worm gear driven portion; a reset groove, a recess, a transition portion and a boss are successively provided on the periphery of the cam linkage portion; and a plurality of driving teeth are provided on part of the peripheral wall of the gear driving portion.

8 Claims, 12 Drawing Sheets

(51) Int. Cl.

| | |
|---|---|
| ***H01H 3/40*** | (2006.01) |
| ***H01H 71/70*** | (2006.01) |
| ***H01H 3/42*** | (2006.01) |
| ***H01H 71/12*** | (2006.01) |
| ***H01H 71/24*** | (2006.01) |
| ***H01H 71/64*** | (2006.01) |

(52) U.S. Cl.
CPC .......... *H01H 71/10* (2013.01); *H01H 71/128* (2013.01); *H01H 71/24* (2013.01); *H01H 71/64* (2013.01); *H01H 71/70* (2013.01)

(58) Field of Classification Search
USPC .............................................................. 335/6
See application file for complete search history.

(56) References Cited

U.S. PATENT DOCUMENTS

| | | | | |
|---|---|---|---|---|
| 6,486,417 | B1 | 11/2002 | Toyama et al. | |
| 6,782,578 | B1 * | 8/2004 | Rief | E04H 4/1654 15/1.7 |
| 6,854,148 | B1 * | 2/2005 | Rief | E04H 4/1654 15/1.7 |
| 9,500,133 | B2 * | 11/2016 | Davis | F02C 7/32 |
| 2011/0076144 | A1 * | 3/2011 | Lucas | F03B 17/067 416/79 |
| 2011/0088181 | A1 * | 4/2011 | Rief | E04H 4/1654 15/1.7 |
| 2011/0192692 | A1 * | 8/2011 | Werner | F16F 15/12353 192/3.29 |

FOREIGN PATENT DOCUMENTS

| | | | |
|---|---|---|---|
| CN | 104167338 | A | 11/2014 |
| CN | 105070608 | A | 11/2015 |
| CN | 105097371 | A | 11/2015 |
| CN | 105097372 | A | 11/2015 |
| CN | 105118745 | A | 12/2015 |
| CN | 105118746 | A | 12/2015 |
| CN | 205004282 | U | 1/2016 |
| CN | 205004283 | U | 1/2016 |
| CN | 205004284 | U | 1/2016 |
| CN | 205028865 | U | 2/2016 |
| CN | 105719920 | A | 6/2016 |
| CN | 105742129 | A | 7/2016 |

* cited by examiner

LINKAGE GEAR MECHANISM FOR AUTOMATIC OPENING/CLOSING DRIVING MECHANISM

The present application is a National Phase entry of PCT Application No. PCT/CN2016/094613, filed Aug. 11, 2016, which claims the benefit of Chinese Patent Application No. 201510490083.1, filed Aug. 12, 2015, and Chinese Patent Application No. 201520601886.5, filed Aug. 12, 2015, which are incorporated herein by reference.

TECHNICAL FIELD

The present invention belongs to the technical field of miniature circuit breakers, and particularly relates to a linkage gear mechanism for an automatic opening/closing driving mechanism.

BACKGROUND

In accordance with the demand for the intelligent power supply network in China, the State Grid Corporation of China requires the power supply network to be intelligent. Therefore, a terminal actuator for the power supply network, i.e., a miniature circuit breaker (or a micro circuit breaker) is required to actuate uplink signals to provide tripping and closing functions. Hence, as the current development trend, in addition to the conventional manual opening/closing function and automatic overcurrent/overload release function, the miniature circuit breaker is further required to have an electric opening/closing function (called an automatic opening/closing function) so as to realize remote control, particularly a function of realizing, in conjunction with a smart meter, automatic tripping in arrearage and automatic power transmission with sufficient prepayment.

Since the conventional miniature electric opening/closing circuit breakers cannot meet the requirements of the power companies due to their complicated structure, proneness to fault and functional insufficiency, those skilled in the art have been focused on where the difficulty lies, that is, continuously improving the structure of the conventional miniature electric opening/closing circuit breakers in order to meet the ever higher requirements of consumers.

SUMMARY

An objective of the present invention is to provide a linkage gear mechanism for an automatic opening/closing driving mechanism, which is relatively simple in structure and realizes the integration of various functions.

To achieve the objective of the present invention, the following technical solution is provided. A linkage gear mechanism for an automatic opening/closing driving mechanism is wherein it is integrally and concentrically provided with a worm gear driven portion, a gear driving portion and a cam linkage portion successively in a direction of the rotation central axis thereof; worm gear teeth fitted with a driving worm gear are provided on the whole peripheral wall of the worm gear driven portion; a reset groove, a recess, a transition portion and a boss are successively provided along the periphery of the cam linkage portion; and a plurality of driving teeth are provided on part of the peripheral wall of the gear driving portion.

In the technical solution, a plurality of driving teeth are provided on a part of the peripheral wall of the gear driving portion abutting the boss of the cam linkage portion.

In the technical solution, the plurality of driving teeth and the boss of the cam linkage portion are substantially the same in terms of their positions on respective peripheral walls, and central angles and lengths of arcs covered by them.

In the technical solution, peripheral rims of the recess and the boss are concentric arcs with different radiuses, the peripheral rim of the boss having a radius greater than that of the peripheral rim of the recess; and one end of the peripheral rim of the transition portion connected to the recess is straight, while the other end thereof connected to the boss is curved.

In the technical solution, the reset groove is recessed toward the tangential direction of the peripheral rim of the recess.

In the technical solution, an inductive magnet that synchronously rotates with the linkage gear mechanism is further provided on the linkage gear mechanism.

DETAILED DESCRIPTION

Embodiment 1

Figure 1:
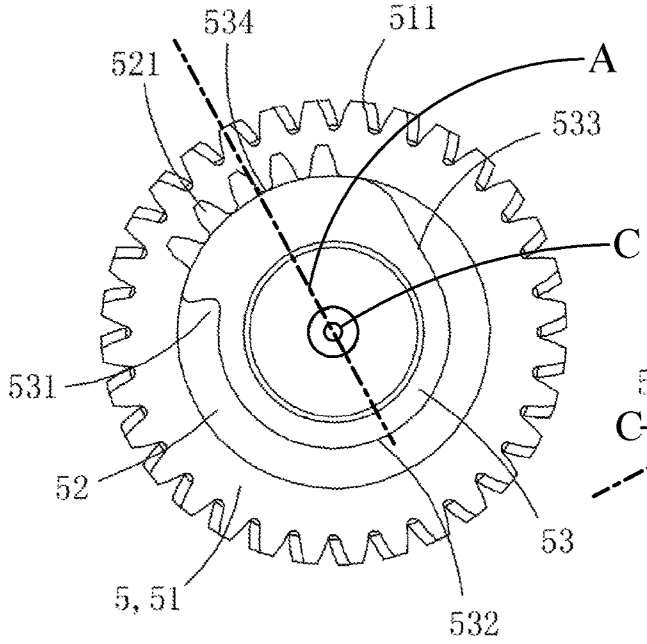
FIG. 1 is a front view of the present invention.
Figure 2:
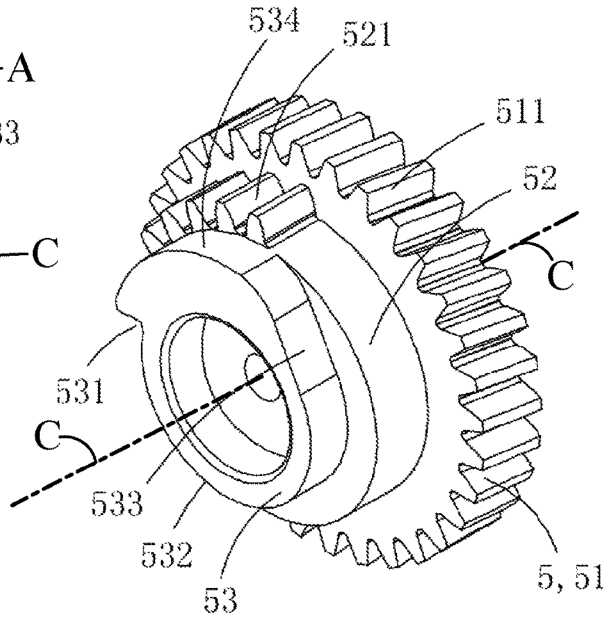
FIG. 2 is a perspective view of the linkage gear mechanism of FIG. 1.
Figure 3:
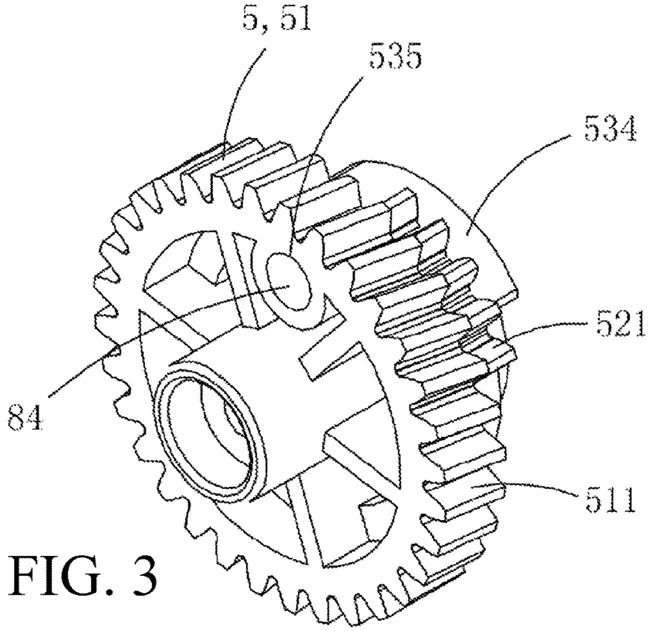
FIG. 3 is a perspective view of the linkage gear mechanism of FIG. 1 viewed from another angle.
Figure 4:
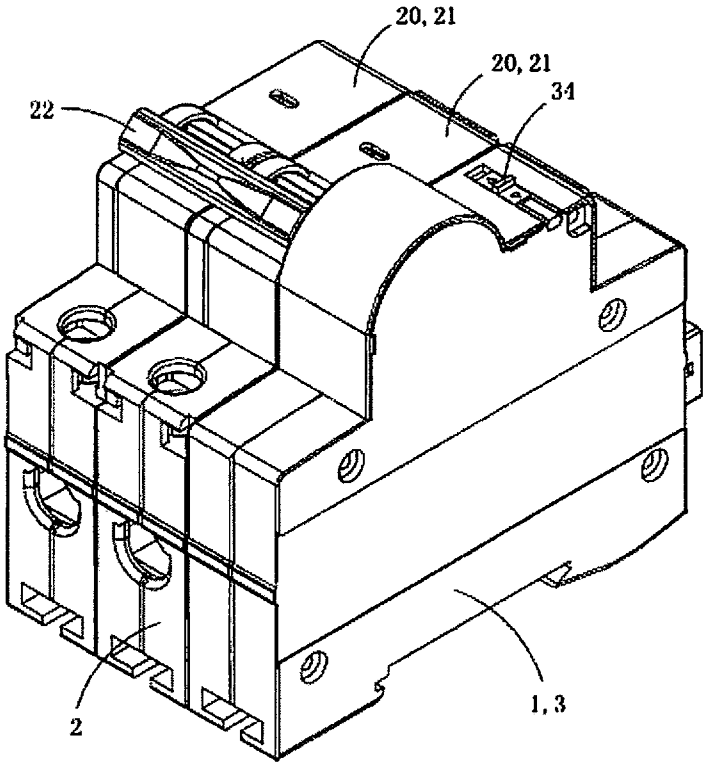
FIG. 4 is a perspective view of a miniature circuit breaker with the linkage gear mechanism of FIG. 1.
Figure 5:
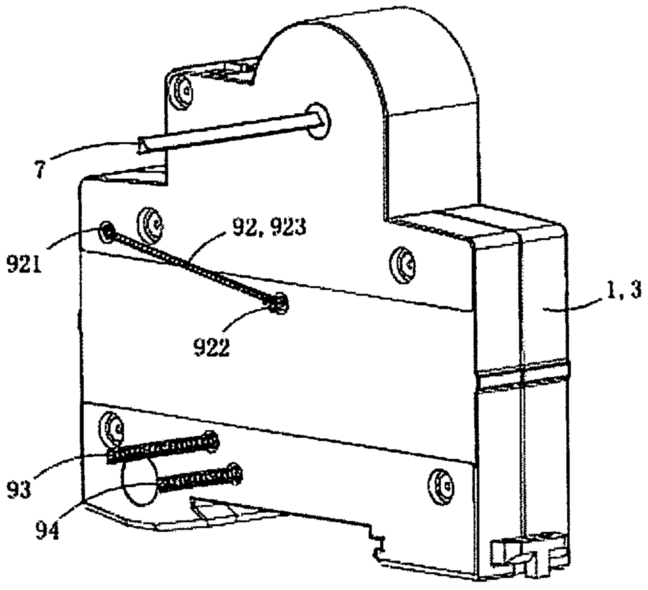
FIG. 5 is a perspective view of an automatic opening/closing driving mechanism in the miniature circuit breaker of FIG. 4.
Figure 6:
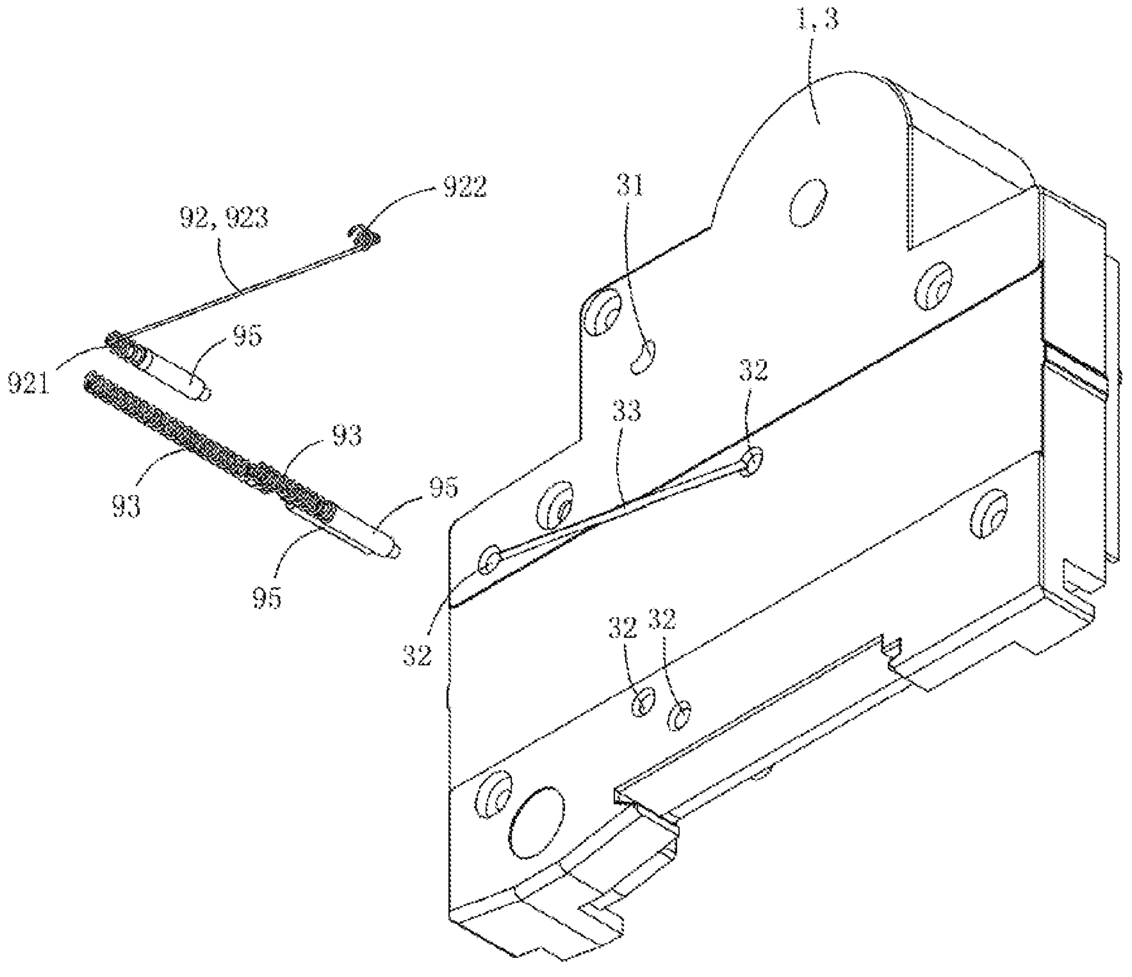
FIG. 6 is an exploded view of the automatic opening/closing driving mechanism of FIG. 5.
Figure 7:
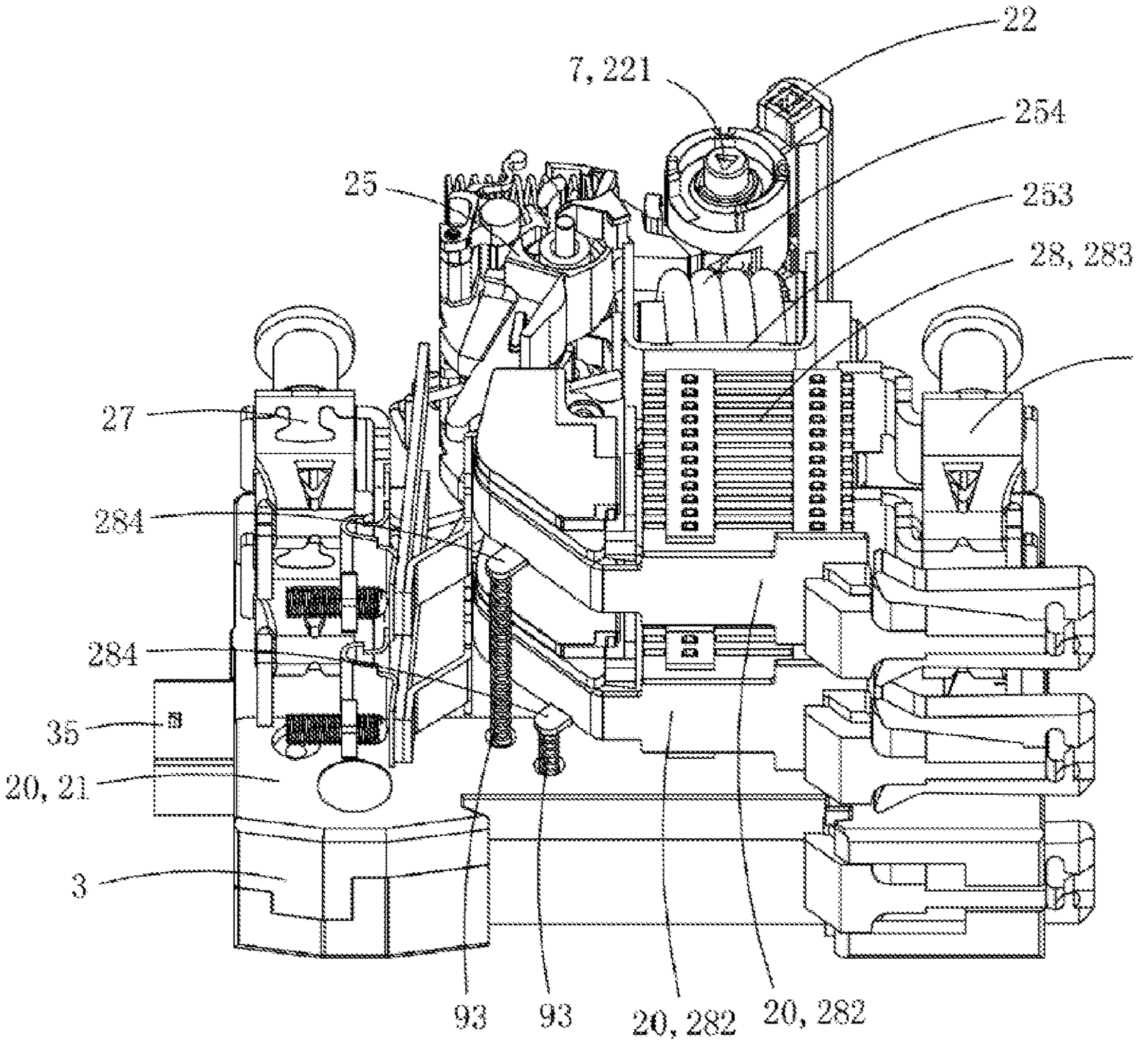
FIG. 7 is a perspective view of the miniature circuit breaker of FIG. 4 with part of the plastic housing removed.
Figure 8:
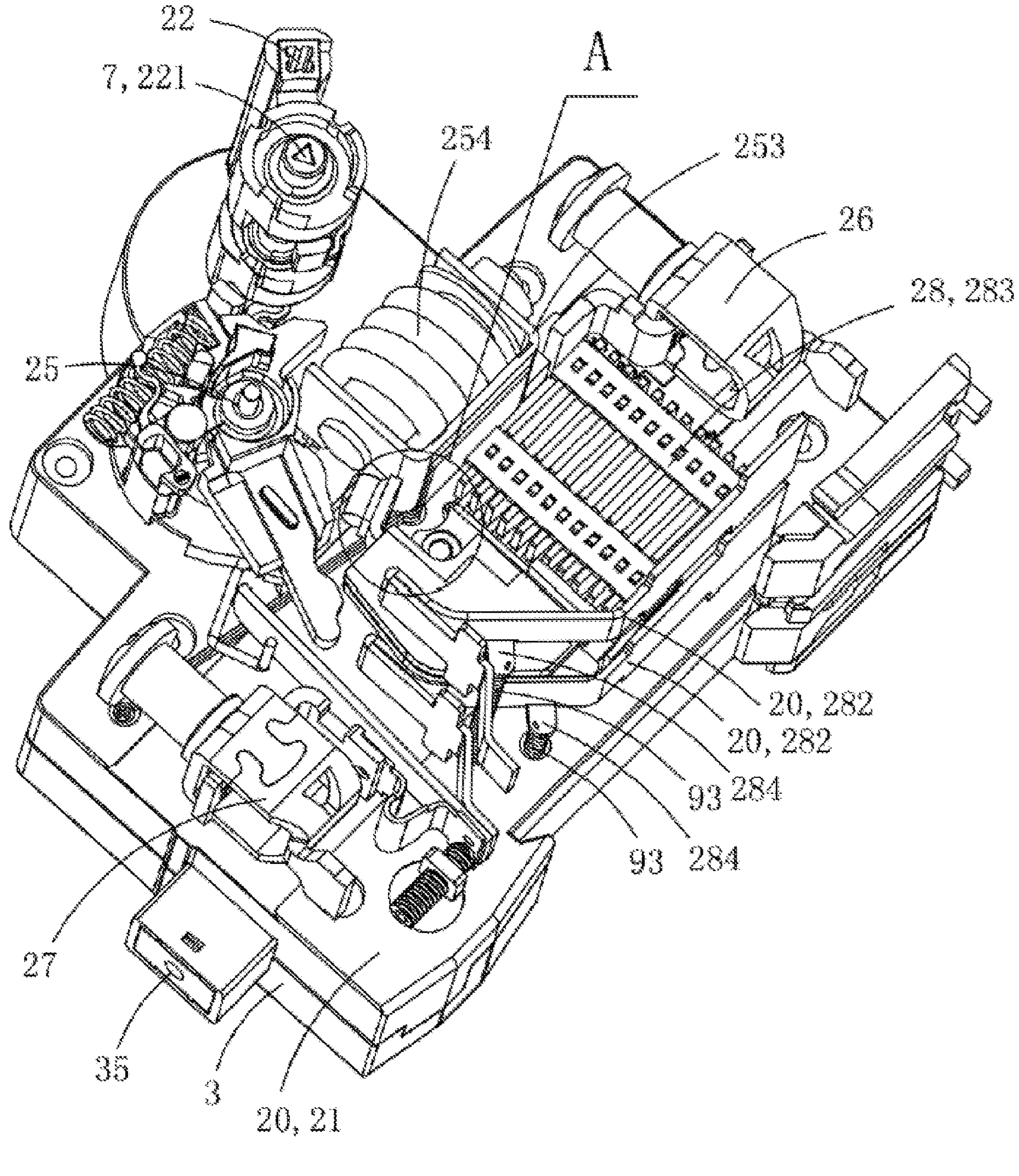
FIG. 8 is a perspective view of the miniature circuit breaker of FIG. 7 viewed from another angle.
Figure 9:
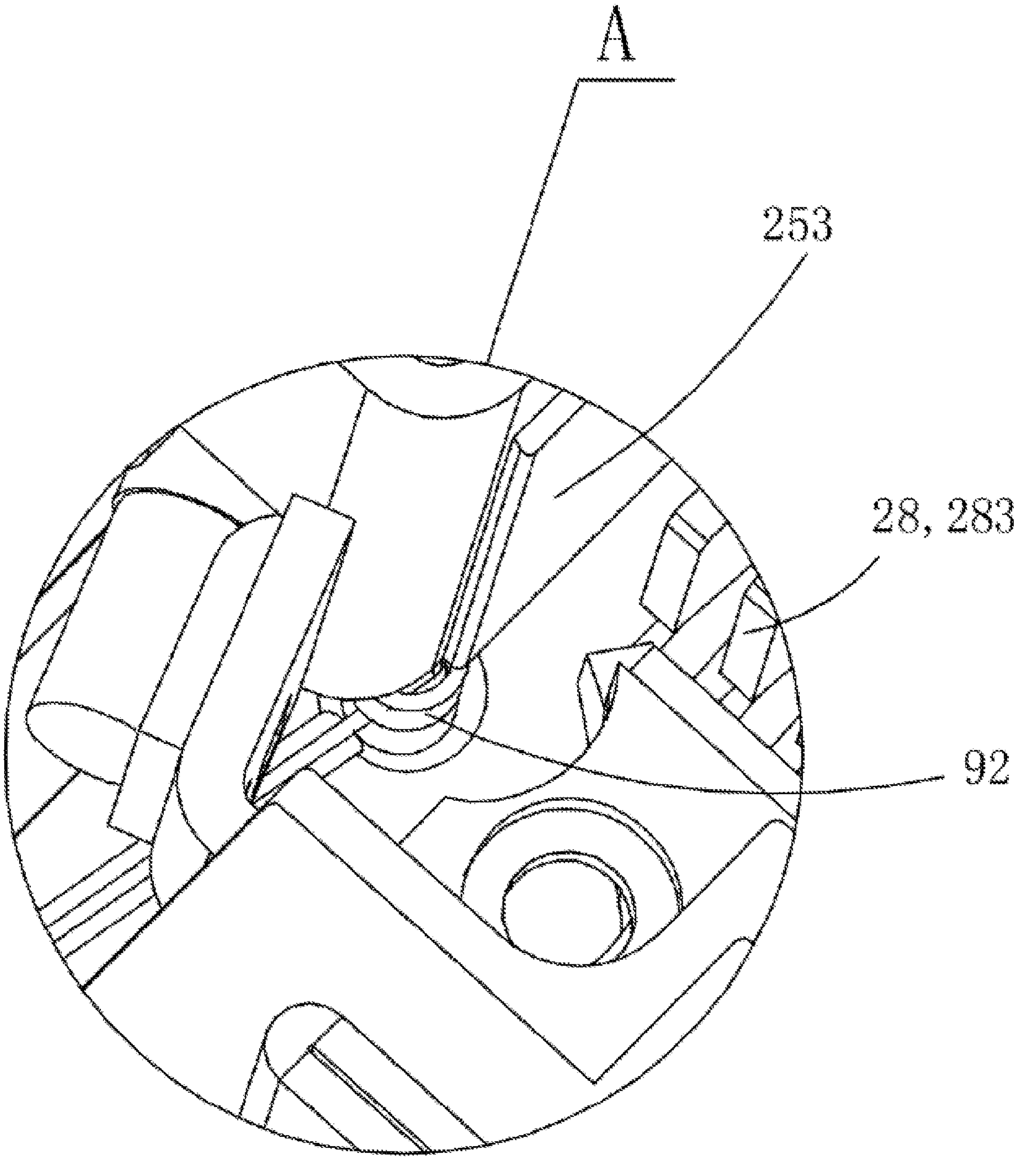
FIG. 9 is a partially enlarged view at A in FIG. 8.
Figure 10:
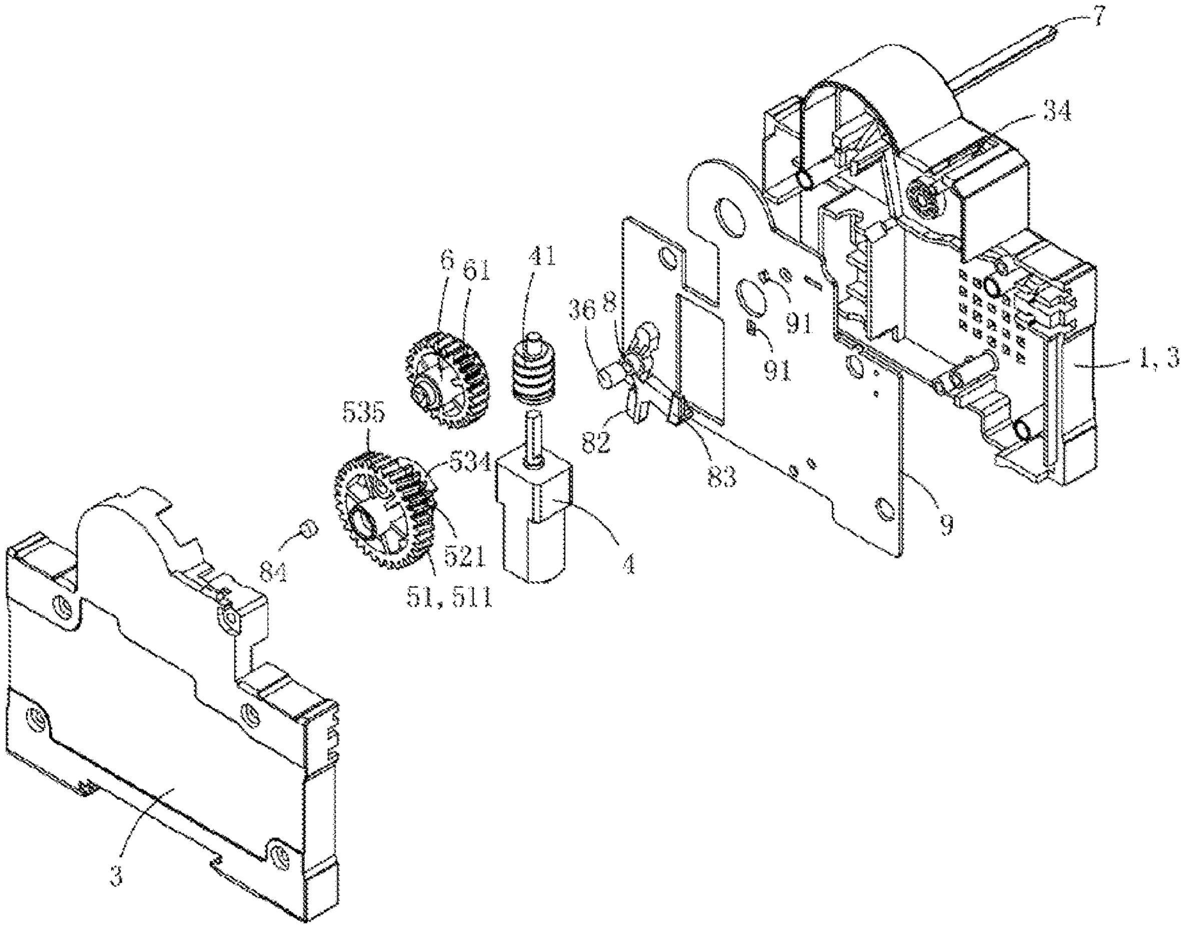
FIG. 10 is an exploded view of the automatic opening/closing driving mechanism of FIG. 5 with the electroscope spring and the charging spring removed.

FIGS. 1 to 3 show a specific implementation of the present invention.

This embodiment provides a linkage gear mechanism for an automatic opening/closing driving mechanism, wherein the linkage gear mechanism is integrally and concentrically provided with a worm gear driven portion 51, a gear driving portion 52 and a cam linkage portion 53 successively in a direction of the rotation central axis C thereof; worm gear teeth 511 fitted with a driving worm gear are provided on the whole peripheral wall of the worm gear driven portion; a reset groove 531, a recess 532, a transition portion 533 and a boss 534 are successively provided on the periphery of the cam linkage portion; and a plurality of driving teeth 521 are provided on part of the peripheral wall of the gear driving portion.

A plurality of driving teeth 521 are provided on a part of the peripheral wall of the gear driving portion abutting the boss of the cam linkage portion.

The plurality of driving teeth 521 and the boss 534 of the cam linkage portion are substantially the same in terms of their positions on respective peripheral walls, and central angles and lengths of arcs covered by them.

Peripheral rims of the recess 532 and the boss 534 are concentric arcs with different radiuses, the peripheral rim of the boss having a radius greater than that of the peripheral rim of the recess; and one end of the peripheral rim of the transition portion 533 connected to the recess is straight, while the other end thereof connected to the boss is curved. The boss 534 is asymmetrical about the axis A. Axis A is perpendicular to the rotation central axis C, and axis A is parallel to a flat planar portion of the transition portion.

The reset groove 531 is recessed toward the tangential direction of the peripheral rim of the recess An inductive magnet 84 that synchronously rotates with the linkage gear mechanism is further provided on the linkage gear mechanism.

The present invention has the following technical effects: the present invention is relatively simple in structure and realizes the integration of various functions.

Embodiment 1

FIGS. 4 to 22 show a specific implementation of the present invention.

This embodiment will be described below in detail with reference to the accompanying drawings.

As shown in FIGS. 4 to 22, this embodiment provides a miniature circuit breaker with an automatic opening/closing function utilizing Embodiment 1, including a circuit breaker body 2 and an automatic opening/closing driving mechanism 1. In this embodiment, the circuit breaker body includes two circuit breakers 20 (also called miniature circuit breakers or micro circuit breakers). In specific practices, according to the specific requirements, the number of miniature circuit breakers forming the circuit breaker body may be randomly selected from 1 to 4.

Each circuit breaker includes a plastic housing 21, an opening/closing handle 22, a moving contact, a static contact, a manipulation mechanism 25, a charging wiring terminal 26, a discharging wiring terminal 27 and an arc-extinguishing mechanism 28; and each opening/closing handle is provided with a spindle hole 221 at the rotation center.

The manipulation mechanism of each circuit breaker includes an opening release linkage rod 251 and an opening release linkage groove 252. A linkage hole 211 is formed on the wall of the plastic housing. When the two circuit breakers are adjacent, the opening release linkage rod of one of the circuit breakers passes through a corresponding linkage hole and is then inserted into the opening release linkage groove of the other circuit breaker. In this embodiment, the opening release linkage rod of the circuit breaker farther away from the automatic opening/closing driving mechanism passes through a corresponding linkage hole and is then inserted into the opening release linkage groove of the circuit breaker closer to the automatic opening/closing driving mechanism.

Each opening release linkage rod has two states. When a circuit breaker is closed, its opening release linkage rod is at a quasi-release position; and when a circuit breaker is opened, its opening release linkage rod is at an original position. When the circuit breaker is in the closed state, if the opening release linkage rod is prodded to the original position, the manipulation mechanism will drive the opening/closing handle to perform an opening (tripping) action. When the circuit breaker is in the opened state, if the opening/closing handle is not pulled, an attempt to prod the opening release linkage rod toward the quasi-release position will not perform a closing action; and if the opening release linkage rod is locked at this time, the manipulation mechanism cannot perform the closing action and the static contact cannot be closed even if the opening/closing handle is pulled to the closed position by an external force, and once the external force is removed, the opening/closing handle will automatically return to the opened position. Therefore, in the opened state, by locking the opening release linkage rod, the circuit breaker can be prevented from performing the closing action. The above structure and its technical effects are known to those skilled in the art, and therefore will not be described in detail herein.

When there are more than two circuit breakers, by pulling one of the opening release linkage rods, all the other opening release linkage rods can be driven to perform synchronous opening actions.

The automatic opening/closing driving mechanism 1 includes a case 3, a driving motor 4 provided with a driving worm gear 41, a linkage gear mechanism 5, a linkage gear 6, an output spindle 7 and a release linkage member 8. In this embodiment, the output spindle has a triangular cross-section; each of the linkage gear mechanism, the linkage gear and the release linkage member are rotatably arranged in the case; and the rotation center axes of the linkage gear mechanism, the linkage gear and the release linkage member are parallel to each other, and the central axes of the output spindle and the opening release linkage rod are also parallel to the rotation central axis C of the linkage gear mechanism. One end of the output spindle is fixedly inserted at the center of the linkage gear, while the other end thereof extends out of the case and is then inserted into the spindle hole of each opening/closing handle. In this embodiment, since the output spindle of the automatic opening/closing driving mechanism has a triangular cross-section, the spindle hole is also triangular. In specific practices, the output spindle may have a rhombic cross-section, a rectangular cross-section or a cross-section in other polygonal shapes, and the shape of the corresponding spindle hole may change accordingly as long as the output spindle can be inserted into the spindle hole and can synchronously drive each opening/closing handle to rotate.

The opening release linkage rod of one of the circuit breaker adjacent to the automatic opening/closing driving mechanism extends into the case of the automatic opening/closing driving mechanism, and the automatic opening/closing driving mechanism may cause all circuit breakers to synchronously perform a fast opening action by prodding the opening release linkage rod.

The linkage gear mechanism is integrally and concentrically provided with a worm gear driven portion 51, a gear driving portion 52 and a cam linkage portion 53 successively along its rotation central axis C. Worm gear teeth 511 fitted with the driving worm gear are provided on the whole peripheral wall of the worm gear driven portion. A reset groove 531, a recess 532, a transition portion 533 and a boss 534 are successively provided along the periphery of the cam linkage portion. A plurality of driving teeth 521 fitted with the linkage gear are provided on a part of the peripheral wall of the gear driving portion abutting the boss of the cam linkage portion. In this embodiment, the plurality of driving teeth 521 and the boss 534 of the cam linkage portion are substantially the same in terms of their positions on respective peripheral walls, and central angles and lengths of arcs covered by them. Such structure ensures that the boss and the linkage teeth reach a certain angle substantially simultaneously.

In addition, in this embodiment, peripheral rims of the recess 532 and the boss 534 are concentric arcs with different radiuses, with the peripheral rim of the boss having a radius greater than that of the peripheral rim of the recess. One end of the peripheral rim of the transition portion 533 connected to the recess is straight, while the other end thereof connected to the boss is curved. The reset groove 531 is preferably recessed toward the tangential direction of the peripheral rim of the recess. In specific practices, it is possible to properly adjust the structural relationship according to the actual requirements and the size of the components, and these adjustments shall fall into the protection scope of the present invention.

Figure 11:
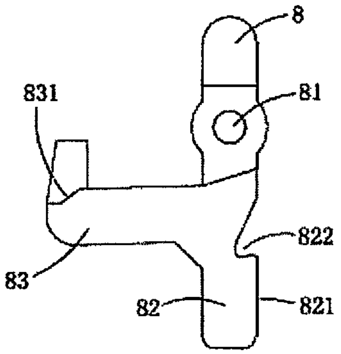
FIG. 11 is a front view of a release linkage member in the automatic opening/closing driving mechanism of FIG. 5.
Figure 12:
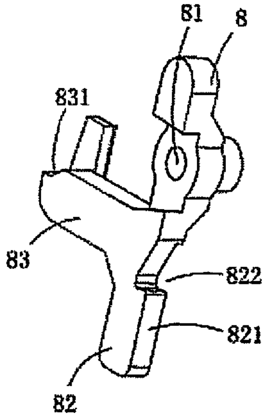
FIG. 12 is a perspective view of the release linkage member of FIG. 11.
Figure 13:
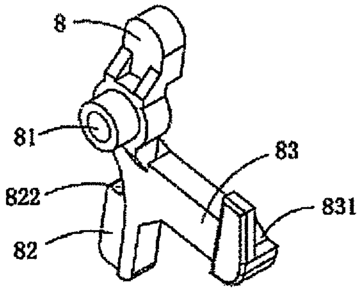
FIG. 13 is a perspective view of the release linkage member of FIG. 11 viewed from another angle.

As shown in FIGS. 11 to 13, a rotation central hole 81, a transmission rod portion 82 and a lever portion 83 are provided on the release linkage member. The transmission rod portion is provided with a transmission contact surface 821 abutting against the peripheral wall of the cam linkage portion of the linkage gear mechanism, and a reset gap 822 is arranged on the transmission contact surface. The release linkage member is rotatably arranged in the case via a pin shaft inserted into the rotation central hole of the release linkage member.

When the miniature circuit breaker in this embodiment is placed in an meter box, generally, since a guide rail is vertically arranged along the horizontal line in the meter box, the circuit breaker body is clamped on the guide rail via a bottom wall on which a clamping rail is provided. The side face of the circuit breaker body provided with the opening/closing handle faces the user as a front side so as to facilitate pulling of the opening/closing handle, the end thereof on the side provided with the charging wiring terminal serves as a top end, the end thereof on the side provided with the discharging wiring terminal functions as a bottom end, and the other two side faces serve as a left end and a right end respectively. In accordance with this placement state, a release linkage hole 31, a power connection groove 33 and a plurality of power connection holes 32 are provided on the left wall of the case of the automatic opening/closing driving mechanism in this embodiment.

The opening release linkage rod 251 of a circuit breaker adjacent to the automatic opening/closing driving mechanism passes through the release linkage hole 31 and extends into the case of the automatic opening/closing driving mechanism. A stopper sleeve 36 is further provided in the case as sleeved on the opening release linkage rod 251 inserted into the case. The lever portion 83 of the release linkage member may perform a fast releasing and opening action by pulling the stopper sleeve 36 or the opening release linkage rod 251. In this embodiment, it is preferred that the lever portion 83 pulls the opening release linkage rod 251 to perform the fast releasing and opening action. In addition, a limiting corner 831 is further provided at the tail end of the lever portion 83. The outer rim of the limiting corner forms an obtuse angle. The lever portion 83 pulls and locks the opening release linkage rod 251 by the limiting corner 831.

A circuit board 9 with a central control circuit is further provided in the case of the automatic opening/closing driving mechanism. A mounting hole 535 is further provided on the linkage gear mechanism, and an inductive magnet 84 is embedded into the mounting hole. Two inductive switches 91 fitted with the inductive magnet are provided on the circuit board. The inductive magnet triggers a corresponding inductive switch when reaching a preset position as rotating with the linkage gear mechanism so as to transmit a signal to the central control circuit, so that the central control circuit may determine the rotation position of the linkage gear mechanism according to the change of the signal. A toggle switch 34 for turning on or off the central control circuit is provided on the front face of the case. A signal wiring terminal 35 is provided at an upper end of the case, and the central control circuit is connected to the signal wiring terminal 35.

The automatic opening/closing driving mechanism in this embodiment further includes a charging spring 92 and two electroscope springs 93. The charging spring is electrically connected to the circuit board and the charging wiring terminal of a circuit breaker adjacent to the automatic opening/closing driving mechanism. The charging spring is used for receiving power from this circuit breaker to provide a working power to the circuit board. Each electroscope spring is electrically connected to the circuit board and the discharging wiring terminal of each circuit breaker. Each electroscope spring is used for obtaining power from each circuit breaker to allow the central control circuit to judge whether the circuit breaker is in the opened or closed state. When the electroscope spring is powered on, the corresponding circuit breaker may be considered to be in the closed state; and when the electroscope spring is not powered on, the corresponding circuit breaker may be considered to be in the opened state. In specific practices, the number of the charging spring and the electroscope spring may be determined according to the specific requirements for the circuit control.

Figure 14:
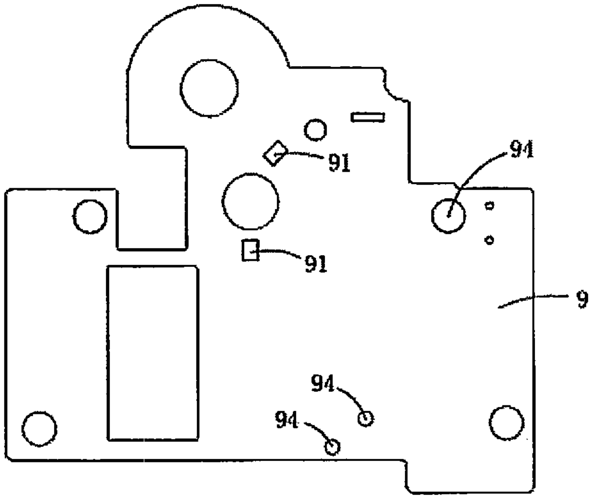
FIG. 14 is a front view of a circuit board in the automatic opening/closing driving mechanism of FIG. 10.

Specifically, as shown in FIG. 14, a plurality of power connection contacts 94 are provided on the circuit board in this embodiment. The power connection contacts are solder joints, solder holes or copper sheets arranged on the circuit board. Since an annular conducting layer is coated on the peripheral edge of a solder hole on a conventional circuit board and thus such solder hole may be used as a power connection contact, preset solder holes on the circuit board are preferably used as power connection contacts in this embodiment.

In order to bypass the mounting positions of the driving motor, the linkage gear mechanism, the linkage gear and the release linkage member, the charging spring 92 in this embodiment is designed in a Z-shaped structure with a straight rod body 923 in the middle portion, a first threaded spring body 921 abutting against the corresponding power connection contact on the circuit board at one end, and a second threaded spring body 922 abutting against a conducting component of a circuit breaker adjacent to the automatic opening/closing driving mechanism at the other end, the conducting component being electrically connected to the charging wiring terminal of the circuit breaker. The straight rod body 923 of the charging spring 92 is embedded into the power connection groove 33, so that it will not hinder the side-by-side mounting of the case of the automatic opening/closing driving mechanism and the plastic housing of an adjacent circuit breaker.

The electroscope spring 93 in this embodiment is designed in a straight threaded spring structure with one end abutting against a corresponding power connection contact on the circuit board and the other end abutting against the conducting component of each circuit breaker, the conducting component being electrically connected to the discharging wiring terminal of the circuit breaker.

In a more preferred embodiment, a power connection post 95 is additionally provided at one or two ends of the charging spring and the electroscope spring. In this embodiment, the middle portion of the power connection post is cylindrical, and a bump is provided at the center of each of the two ends of the power connection post. The bump at one end is inserted into a corresponding solder hole serving as a power connection contact on the circuit board, while the bump at the other end extends into the first threaded spring body 921 of the charging spring or extends into the electroscope spring. This solution is also possible, and has higher conductivity and better positioning performance.

In this embodiment, the manipulation mechanism of a circuit breaker adjacent to the automatic opening/closing driving mechanism includes an electromagnetic release mechanism 254 having a metal framework 253 that is electrically connected to the charging wiring terminal of the circuit breaker. One end of the charging spring abuts against a corresponding power connection contact, while the other end thereof successively passes through the case of the automatic opening/closing driving mechanism and the plastic housing of the circuit breaker and then abuts against the metal framework. An arc-extinguishing chamber 283, an upper arc-striking slice 281 electrically connected to the charging wiring terminal, and a lower arc-striking slice 282 connected to the discharging wiring terminal are provided in the arc-extinguishing mechanism of each circuit breaker. One end of a corresponding electroscope spring abuts against a corresponding power connection contact, while the other end thereof successively passes through the case of the automatic opening/closing driving mechanism and the plastic case of the circuit breaker and then abuts against a corresponding lower arc-striking slice.

In a more preferred embodiment, a flat power connection board portion 284 perpendicular to the arc-striking slice and parallel to the circuit boards is provided on each lower arc-striking slice. One end of each electroscope spring abuts against a corresponding power connection contact, while the other end thereof abuts against a power connection board portion.

The working process of this embodiment is as follows: first, a signal wiring terminal 35 is connected to an external smart meter via a signal line, and the toggle switch 34 on the front face of the case of the automatic opening/closing driving mechanism is toggled to an "ON" position so that the central control circuit operates normally.

Figure 15:
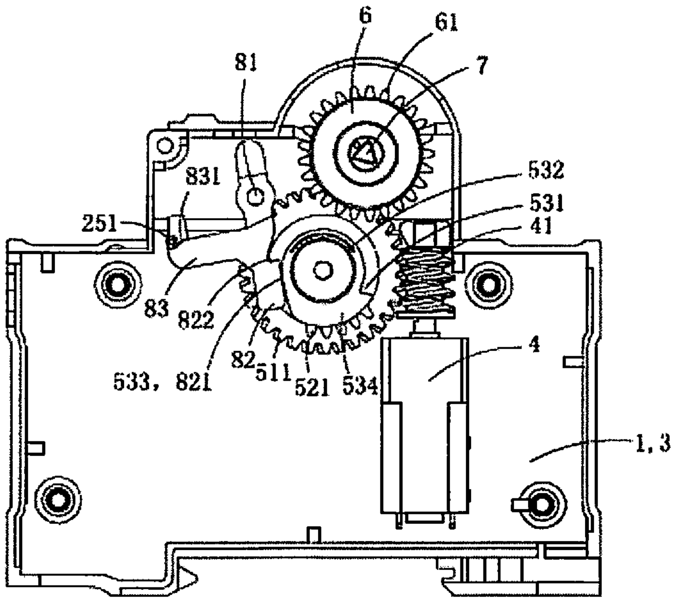
FIG. 15 is a structure diagram of the automatic opening/closing driving mechanism of FIG. 10 in the normal use state with sufficient balance.
Figure 16:
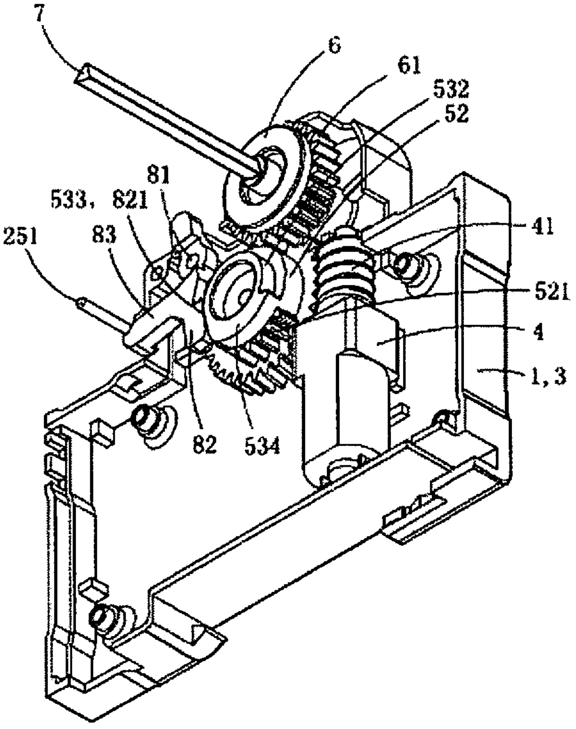
FIG. 16 is a perspective view of the automatic opening/closing driving mechanism of FIG. 15.

As shown in FIGS. 15 and 16, in this embodiment, when in the normal use state with sufficient balance, each circuit breaker is in the closed state, and the opening release linkage rod 251 in each circuit breaker is at the quasi-release position. At this time, the transmission contact surface 821 of the release linkage member 8 abuts against the transition portion 533 of the cam linkage portion 53 in the linkage gear mechanism 5, the limiting corner 831 of the lever portion 83 in the release linkage member 8 does not apply a push force to the opening release linkage rod 251, and the driving teeth 521 of the gear driving portion 52 in the linkage gear mechanism does not contact with the linkage gear. The linkage gear is actually separated from the linkage gear mechanism, and the forward/backward rotation of the linkage gear will not be hindered by the linkage gear mechanism. Therefore, in this state, the automatic opening/closing driving mechanism will not hinder the rotation of the opening/closing handle in the circuit breaker body. At this time, the opening/closing handle may freely perform opening and closing operations, that is, it may freely perform manual opening and closing operations.

Figure 17:
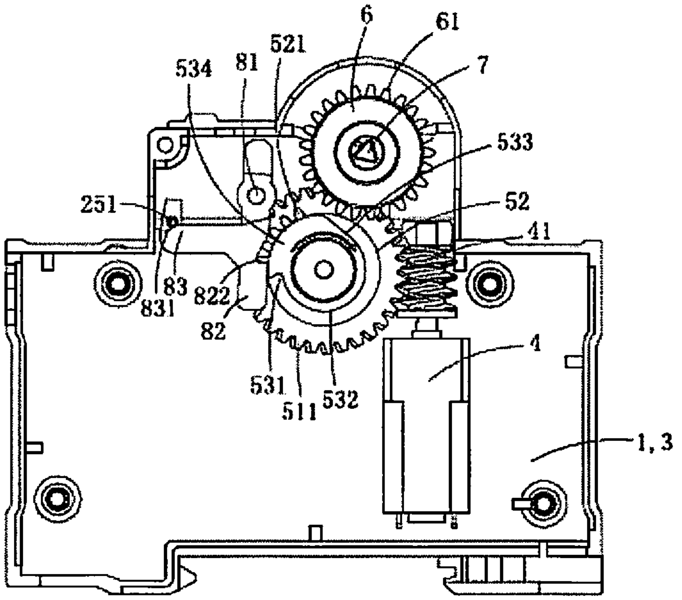
FIG. 17 is a structure diagram of the automatic opening/closing driving mechanism of FIG. 10 in the opened state due to arrearage.
Figure 18:
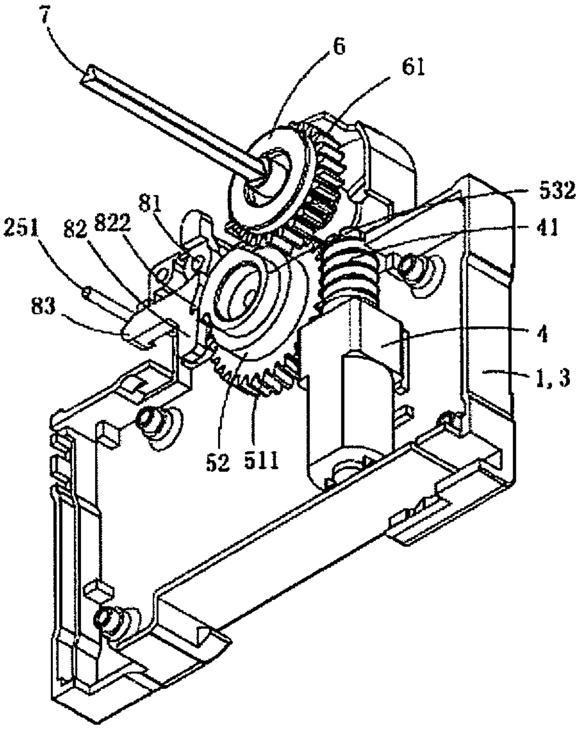
FIG. 18 is a perspective view of the automatic opening/closing driving mechanism of FIG. 17.

As shown in FIGS. 17 and 18, in this embodiment, when in the opened state due to arrearage, each circuit breaker is in the opened state. In case of arrearage, the external smart meter transmits a signal to the central control circuit on the circuit board, and the driving motor rotates to drive the linkage gear mechanism to rotate via the driving worm gear 41. The linkage gear mechanism rotates from the position shown in FIG. 15 in a clockwise direction, and the boss 534 in the cam linkage portion also rotates clockwise together with the linkage gear mechanism. Since the peripheral rim of the boss has a radius greater than the radius of the peripheral rim of the transition portion 533, the boss pushes the transmission rod portion of the release linkage member when the boss instead of the recess abuts against the transmission contact surface, so that the release linkage member rotates clockwise about the rotation central hole 81 thereof. When the linkage gear mechanism rotates to the position shown in FIG. 17, the driving teeth 521 of the gear driving portion 52 in the linkage gear mechanism still does not contact with the linkage gear. At this time, the lever portion of the release linkage member has toggled the opening release linkage rod to cause the opening release linkage rod to jump from the quasi-release position to the original portion, so that each circuit breaker instantaneously changes from the opened state to the tripped state to perform the fast tripping action in case of arrearage. After the opening release linkage member moves to the original position, the release linkage member further locks and limits the opening release linkage rod at the original position via the limiting corner. At this time, if the opening/closing handle is pulled to the closed position by an external force, once the external force is removed, the opening/closing handle will automatically return to the opened position, so that the closing action cannot be realized. At this time, if the toggle switch is turned off, since the motor is powered off and thus unable to perform any action, the opening release linkage rod is still in the locked state, and the user still cannot perform any manual closing action. Therefore, in this embodiment, the unauthorized closing action by the user in case of arrearage may be effectively avoided.

Figure 19:
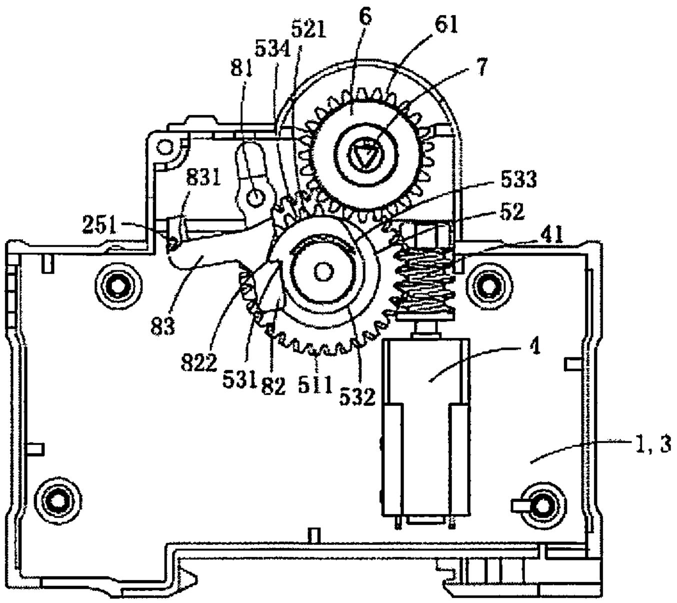
FIG. 19 is a structure diagram of the automatic opening/closing driving mechanism of FIG. 10 in the instantaneous moment of unlocking upon entering the closed state after prepayment.
Figure 20:
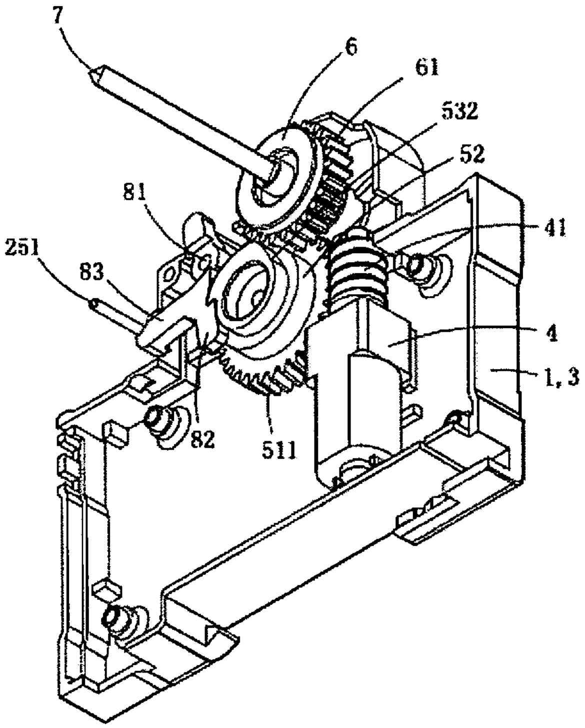
FIG. 20 is a perspective view of the automatic opening/closing driving mechanism of FIG. 19.

As shown in FIGS. 19 and 20, in this embodiment, at the instantaneous moment of unlocking upon entering the closed state after prepayment, each circuit breaker is still in the opened state. Since the opening release linkage rod is locked and limited, the opening release linkage rod needs to be unlocked so as to perform a closing action. The driving motor is rotated to drive the linkage gear mechanism to rotate via its worm gear, so that the linkage gear mechanism rotates from the position shown in FIG. 17 to the position shown in FIG. 19. Under joint effect of the reset groove 531 and the reset gap, a corner of the boss adjacent to the reset groove 531 can be embedded into the reset gap of the release linkage member, so that the transmission contact surface 821 of the release linkage member can abut against the peripheral wall of the recess 532 of the cam linkage portion. At this time, the lever portion has room to rotate and is unable to continue to lock the opening release linkage rod, so that a closed unlocking state with sufficient prepayment is achieved, ensuring that the circuit breakers will not be released in the closing process, that is, the circuit breakers will not fail to close in the closing process. In addition, even if the transmission contact surface 821 of the release linkage member does not abut against the peripheral wall of the recess 532 of the cam linkage portion due to the arrangement position of the circuit breaker (reverse to the normal mounting state described above, for example) at the moment of locking, the unlocking effect will not be influenced, because when the closing action with sufficient prepayment is performed subsequently, the release linkage rod will move from the original position to the quasi-release position and the opening release rod will push the limiting corner of the release linkage member, so that the transmission contact surface 821 of the release linkage member abuts against the peripheral wall of the recess 532 of the cam linkage portion.

Figure 21:
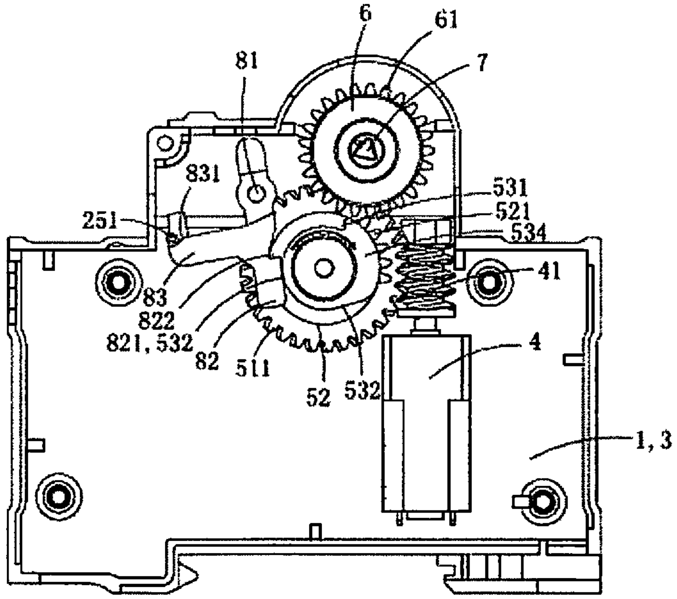
FIG. 21 is a structure diagram of the automatic opening/closing driving mechanism of FIG. 10 in the closed state after prepayment.
Figure 22:
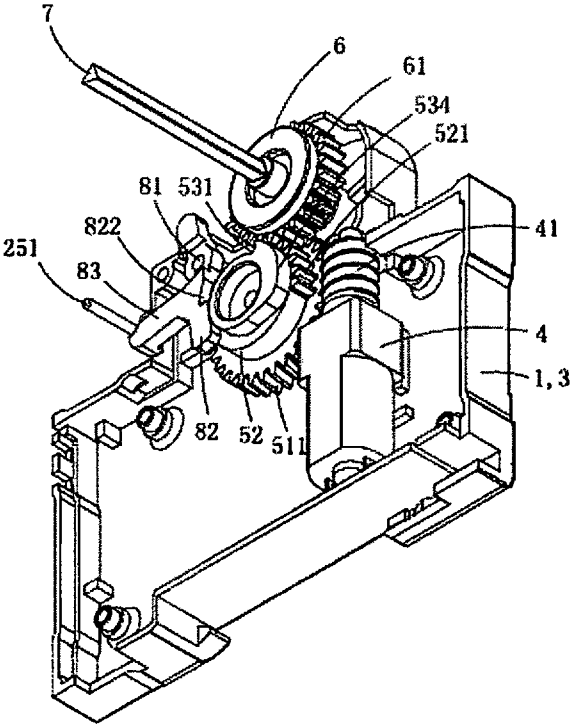
FIG. 22 is a perspective view of the automatic opening/closing driving mechanism of FIG. 20.

As shown in FIGS. 21 to 22, in this embodiment, when in the closed state with sufficient prepayment, each circuit breaker is in the closed state. Since the opening release linkage rod has been unlocked previously, the linkage gear mechanism is driven to further rotate from the position shown in FIG. 19 as the motor starts to rotate, the driving teeth on the linkage gear mechanism are engaged with the linkage gear to toggle the linkage gear to rotate, so that the opening/closing handle of each circuit breaker is driven by the output spindle to perform the closing action. Then, the driving motor continues to rotate, and the linkage gear mechanism is driven to rotate to the position shown in FIG. 15.

When the circuit undergoes maintenance, the circuit breaker needs to be in the opened state. In this case, it is preferred to toggle the toggle switch to the "OFF" position. This is advantageous because the central control circuit is powered off and has no capability to control the rotation of the driving motor, thereby avoiding shock accidents during maintenance process caused by the circuit breaker performing a closing action while being controlled by a remote signal.

The present invention has the following technical effects: (1) this embodiment can control opening and closing by a remote signal, and judge whether the miniature circuit breaker trips due to a fault, arrearage or manual opening. In case of arrearage, the opening may be controlled remotely; and, after prepayment, the closing may be controlled remotely. The miniature circuit breaker will be in the locked state once it is opened remotely, and it can be closed remotely only, and cannot be closed by manually pulling the handle of the miniature circuit breaker. When the miniature circuit breaker is in the remotely closed state, it can be arbitrarily opened or closed by manually pulling the handle of the miniature circuit breaker. (2) When the circuit needs to be maintained, the toggle switch may be toggled to the OFF position so that the intelligent central control circuit is turned off to have no capability to remotely control the driving motor. Due to the loss of the capability of controlling by a remote signal, the miniature circuit breaker cannot be controlled, the maintenance personnel is protected against shock accidents caused by mistaken closing in the maintenance process. (3) In the process of assembling the automatic opening-closing driving mechanism and the miniature circuit breaker, electrical connection is realized by using a power connection spring and an electroscope spring, preferably by additionally providing a power connection post. In comparison, the conventional connection by using leads (polyvinyl chloride cables) has a more complicated assembly/disassembly process as the connection is realized by welding with soldering iron. In the present invention, the elasticity of the spring is utilized to compress one end of the spring or the power connection post on a contact of the circuit board, and to compress the other end of the spring or the power connection post on an arc-striking slice of the miniature circuit breaker, so that the electrical connection is easily realized without welding with soldering iron and the assembly/disassembly process is quick and convenient.

Obviously, the embodiments of the present invention are merely for clearly describing the examples of the present invention, and not intended to limit the implementations of the present invention. For those skilled in the art, other changes or variations in different forms may be made on the basis of the foregoing descriptions. It is unnecessary and impossible to exhaustively list all implementations herein. These obvious changes or variations made within the essence and spirit of the present invention shall fall into the protection scope of the present invention.

The invention claimed is:

1. A linkage gear mechanism for an automatic opening/closing driving mechanism, wherein the linkage gear mechanism is integrally and concentrically provided with a worm gear driven portion, a gear driving portion and a cam linkage portion successively in the direction of its rotation central axis; the worm gear driven portion including worm gear engaging teeth configured to engage with a driving worm gear, the worm gear engaging teeth distributed circumferentially about an entirety of a peripheral wall of the worm gear driven portion; the cam linkage portion including a reset groove, a recess, a transition portion and a boss successively positioned about a periphery of the cam linkage portion, the transition portion including a flat planar portion, and the boss being asymmetrical about an axis perpendicular to the rotation central axis and the axis parallel to the flat planar portion; and the gear driving portion includes a plurality of driving teeth positioned on a portion of a peripheral wall of the gear driving portion.

2. The linkage gear mechanism for an automatic opening/closing driving mechanism according to claim 1, wherein the plurality of driving teeth are provided on a part of the peripheral wall of the gear driving portion abutting the boss of the cam linkage portion.

3. The linkage gear mechanism for an automatic opening/closing driving mechanism according to claim 1, wherein the plurality of driving teeth and the boss of the cam linkage portion are substantially the same in terms of their positions on respective peripheral walls, and central angles and lengths of arcs covered by them.

4. The linkage gear mechanism for an automatic opening/closing driving mechanism according to claim 1, wherein peripheral rims of the recess and the boss are concentric arcs with different radiuses, the peripheral rim of the boss having a radius greater than that of the peripheral rim of the recess; and one end of the peripheral rim of the transition portion connected to the recess is straight, while the other end thereof connected to the boss is curved.

5. The linkage gear mechanism for an automatic opening/closing driving mechanism according to claim 4, wherein the reset groove is recessed toward a tangential direction of the peripheral rim of the recess.

6. The linkage gear mechanism for an automatic opening/closing driving mechanism according to claim 1, further comprising an inductive magnet that synchronously rotates with the linkage gear mechanism.

7. An automatic opening/closing driving mechanism, comprising a case, a driving motor provided with a driving worm gear, the linkage gear mechanism of claim 1, a linkage gear, an output spindle and a release linkage member.

8. A miniature circuit breaker with an automatic opening/closing function, comprising a circuit breaker body and an automatic opening/closing driving mechanism, the automatic opening/closing driving mechanism comprising a case, a driving motor provided with a driving worm gear, the linkage gear mechanism of claim 1, a linkage gear, an output spindle and a release linkage member.

* * * * *